United States Patent
Skultety-Betz et al.

(10) Patent No.: US 7,605,743 B2
(45) Date of Patent: Oct. 20, 2009

(54) METHOD AND DEVICE FOR A MATERIAL-PENETRATIVE LOCALIZATION OF A MEASUREMENT SIGNAL

(75) Inventors: Uwe Skultety-Betz, Leinfelden-Echterdingen (DE); Bjoern Haase, Stuttgart (DE); Michael Mahler, Leinfelden-Echterdingen (DE); Ulli Hoffmann, Nieffern-Oeschelbronn (DE); Reiner Krapf, Reutlingen (DE); Chirstoph Wieland, Herrenberg-Kuppingen (DE); Felix Wewers, Leverkusen (DE)

(73) Assignee: Robert Bosch GmbH, Stuttgart (DE)

( * ) Notice: Subject to any disclaimer, the term of this patent is extended or adjusted under 35 U.S.C. 154(b) by 303 days.

(21) Appl. No.: 11/570,972

(22) PCT Filed: Jun. 13, 2005

(86) PCT No.: PCT/EP2005/052708

§ 371 (c)(1),
(2), (4) Date: Dec. 20, 2006

(87) PCT Pub. No.: WO2006/003076

PCT Pub. Date: Jan. 12, 2006

(65) Prior Publication Data

US 2008/0291076 A1    Nov. 27, 2008

(30) Foreign Application Priority Data

Jun. 30, 2004  (DE)  ........................ 10 2004 031 627

(51) Int. Cl.
*G01S 13/89* (2006.01)
*G01V 3/12* (2006.01)

(52) U.S. Cl. ........................... 342/22; 342/27; 342/179

(58) Field of Classification Search ............... 342/22, 342/27, 28, 179
See application file for complete search history.

(56) References Cited

U.S. PATENT DOCUMENTS

| | | | |
|---|---|---|---|
| 5,177,444 A * | 1/1993 | Cutmore .................... 324/637 |
| 5,177,445 A * | 1/1993 | Cross ........................ 324/637 |
| 5,434,500 A | 7/1995 | Hauck et al. |
| 5,896,102 A * | 4/1999 | Heger ......................... 342/85 |
| 6,359,582 B1 * | 3/2002 | MacAleese et al. ........... 342/22 |
| 6,480,141 B1 * | 11/2002 | Toth et al. .................... 342/22 |
| 6,853,199 B2 * | 2/2005 | Noik et al. .................. 324/637 |
| 2003/0164789 A1 | 9/2003 | Taylor, Jr. et al. |
| 2004/0140923 A1 * | 7/2004 | Tucker et al. ................ 342/22 |
| 2005/0093733 A1 * | 5/2005 | Lovberg et al. ............... 342/22 |
| 2008/0291076 A1 * | 11/2008 | Skultety-Betz et al. ........ 342/22 |
| 2009/0021417 A1 * | 1/2009 | Margaliot .................... 342/22 |
| 2009/0135044 A1 * | 5/2009 | Sutphin ...................... 342/22 |

FOREIGN PATENT DOCUMENTS

| | | |
|---|---|---|
| DE | 34 46 392 | 6/1986 |
| EP | 0 435 585 | 7/1991 |
| GB | 2 289 602 | 11/1995 |
| GB | 2 374 490 | 10/2002 |

* cited by examiner

*Primary Examiner*—John B Sotomayor
(74) *Attorney, Agent, or Firm*—Michael J. Striker

(57) ABSTRACT

The invention relates to a method for the material-penetrative localization of a measurement signal, in particular a material-penetrative positioning method for use on walls, ceilings, and floors.

Figure 1:
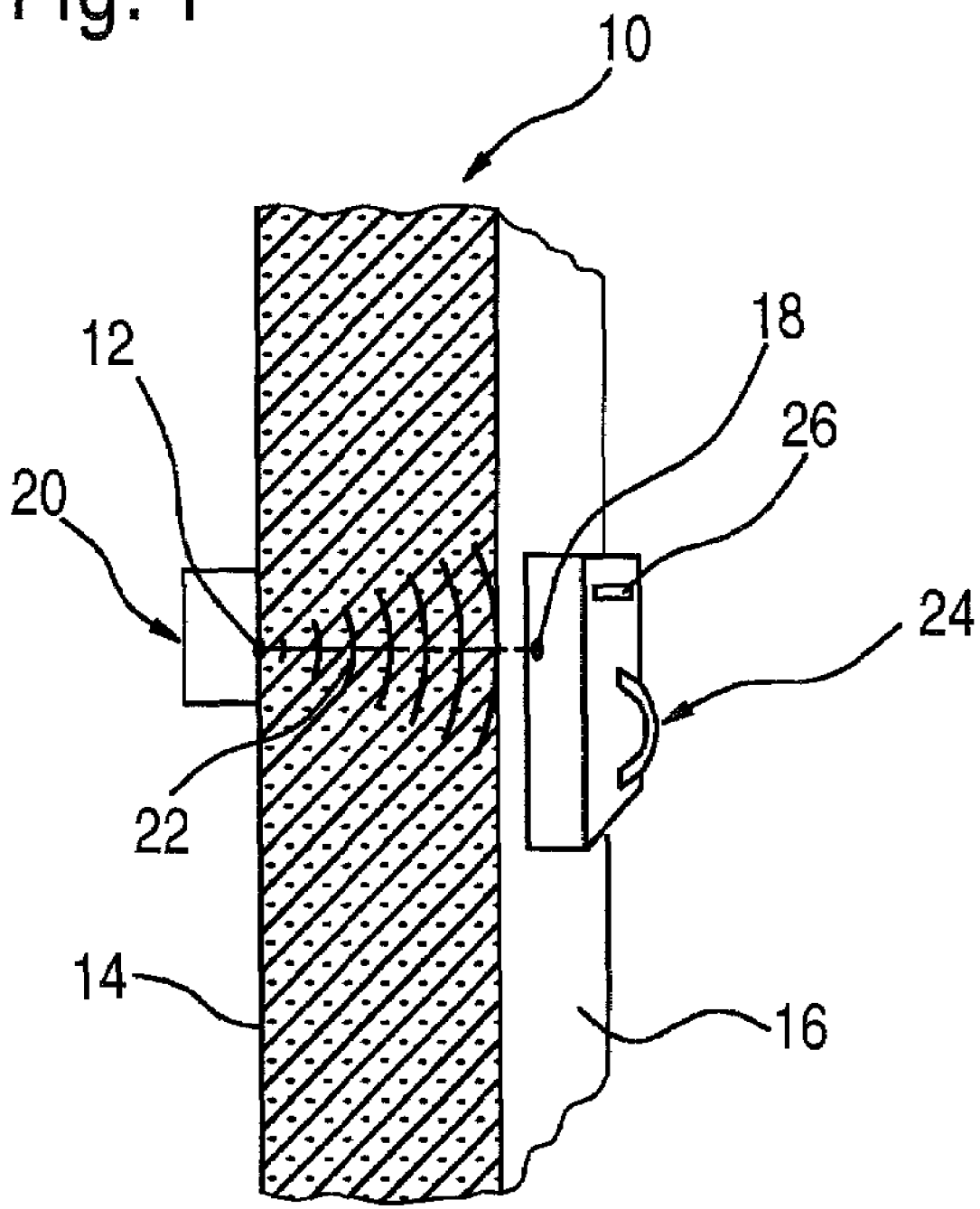

According to the invention, a high-frequency transmitter (20, 120) emits a measurement signal (22, 122) in the gigahertz frequency range, which penetrates the material (10) at least once and is detected by a high-frequency receiver (24, 124) in order to locate the penetration position (18).

The invention also relates to a device for carrying out the method.

14 Claims, 3 Drawing Sheets

METHOD AND DEVICE FOR A MATERIAL-PENETRATIVE LOCALIZATION OF A MEASUREMENT SIGNAL

The present invention relates to a device and a method for the material-penetrative localization of a measurement signal, in particular a device and a method for a material-penetrative positioning method for use on walls, ceilings, and floors.

RELATED ART

Material-penetrative positioning methods are typically used when positioning must be carried out from both sides of a wall, a floor, a ceiling, or the like. This is necessary, e.g., when drilling through to the other side, or when drilling a core. A further application occurs when it is not possible to drill from one side of a material, such as a wall, a floor, or a ceiling, thereby making it necessary to drill from an opposite side of the material, through the material, and toward a specific position.

Auxiliary means are known from the related art which are designed to allow drilling of this type to be carried out in a reliable manner. A small transmitter is typically attached to one side of the material to be drilled through, and a mobile receiver is placed on the other, opposite surface of the material, e.g. on the back of a wall, floor, or ceiling; the receiver determines the penetration point of the measurement signal emitted by the transmitter.

Inductively operating devices are known, with which the transmitter produces a magnetic field, and the associated receiver with a coil assembly can detect the center of this magnetic field.

Publication U.S. Pat. No. 5,434,500, e.g., makes known a magnetic field generator that includes a detector with a position indicator, with which the magnetic field generator serves as a sending unit that is placed on a first side of a wall at the point to be located and creates a magnetic field at this point. The associated detector serves as a receiving unit and is moved over the surface of the wall opposite from the sending unit. The receiving unit includes two pairs of two detectors each that measure the relative strength of the magnetic field. By measuring this relative strength of the magnetic field at each of the individual detectors, it is possible to locate the position of the magnetic field generator and/or the projection of this position on the side of the wall opposite from the generator. With the device described in U.S. Pat. No. 5,434,500, the strength of the detected magnetic field is visualized using an optical display. When the strength of the detected magnetic field is equal at all four detection elements, the receiving unit is located directly opposite the sending unit.

Publication DE 34 46 392 A1 makes known a method for identifying a test point on one side of a wall, from the other side of the wall. With this method, which is used with metallic walls of a container in particular, it is provided—in order to more quickly identify the test point and increase the accuracy of the position identification—that a magnetic pole is placed on the wall at the test point, and that the magnetic field of the magnetic pole penetrating the wall is detected on the opposite side of the wall from the magnetic pole. To detect the magnetic field, a Hall effect component is preferably used with the method described in DE 34 46 392 A1.

The devices known from the related art have the disadvantage, among others, that metallic parts in the material, e.g., a wall, ceiling or floor, such as steel girders or reinforcing rods, greatly interfere with the detection and can even render it impossible to carry out. In addition, the positioning accuracy of devices of this type tends to be poor.

The object of the present invention, therefore, is to provide a method and a device that allow a defined point through a material to be determined quickly, reliably, and precisely.

The object is attained according to the present invention by a method having the features of Claim 1. The object is also attained by a device having the features of Claim 11.

ADVANTAGES OF THE INVENTION

The method according to the present invention for the material-penetrative localization of a measurement signal, in particular the inventive, material-penetrative positioning method for use on walls, ceilings, and floors, uses a high-frequency transmitter that emits a measurement signal in the gigahertz frequency range, which penetrates a material—e.g., a wall, ceiling, or floor—at least once and is detected and located by a high-frequency receiver.

Due to the high-frequency method used, it is possible to more exactly locate the penetration point of the measurement signal, since the claimed method reacts less sensitively to the objects enclosed in the material.

Due to the claimed method, it is now possible to drill through concrete in particular, since projections can be made through concrete walls. Reinforcing rods, which are typically located in concrete walls, pose only minimal interference to the high-frequency method used. The frequency range used also makes it possible to increase the accuracy of positioning. The user can therefore drill through concrete, and through reinforced concrete in particular, when he definitely knows where the drill will emerge on the opposite side of a wall.

Advantageous refinements of the inventive device and the inventive method result from the features indicated with the subclaims.

To increase the measurement accuracy, it is advantageous to use a measurement signal in the gigahertz high-frequency range which has more than one measurement frequency. The high-frequency transmitter launches microwaves in the gigahertz range, e.g., using the FMCW (Frequency Modulated Continuous Wave) method, or a pulsed-radar method, into the wall. This transmitter can therefore generate one or more individual frequencies (FMCW) or produce broadband emissions (pulsed radar).

To penetrate the material it is advantageous to use one or more measurement frequencies in an interval from one gigahertz to five gigahertz. Preferably, frequencies in an interval of 1.5 GHz to 3.5 GHz are used.

On the side of the material opposite from the high-frequency transmitter, a suitable mobile receiver then locates the signals generated by the transmitter.

In an alternative embodiment of the inventive method, it can be provided that the high-frequency transmitter and the high-frequency receiver are operated on the same first surface of the material. With this method, the measurement signal from the high-frequency transmitter is deflected back to the high-frequency receiver by a reflecting means—which can be moved on the second surface of the material opposite from the high-frequency transmitter—after it has penetrated the material.

In a particularly advantageous embodiment of this alternative method, it is provided that the high-frequency transmitter and the high-frequency receiver are operated in the same device.

To display the measurement signal which penetrates the material, with the inventive method, the localization is advantageously carried out using a signal strength display on the high-frequency receiver and/or on the reflecting means. In this manner, the high-frequency receiver or the reflecting means can be positioned, in a defined manner, at the location of maximum signal strength. Using a suitable marking device, a mark can then be placed on the penetration point which was located.

The inventive device for carrying out the claimed method includes at least one high-frequency transmitter which can be placed on a surface of a material, which generates a measurement signal in the gigahertz frequency range which penetrates the material, and a high-frequency receiver.

In a special embodiment of the inventive device, the high-frequency transmitter and the high-frequency receiver are located in the same device.

Further advantages of the inventive method and the inventive device are shown in the drawing, below, and in the associated description of embodiments.

DRAWING

The drawing depicts embodiments of the inventive method for the material-penetrative localization of a measurement signal; it is described in greater detail in the subsequent description. The figures in the drawing, their description and the claims contain numerous features in combination. One skilled in the art will also consider these features individually and combine them to form further reasonable combinations, which are therefore also disclosed in the description.

Figure 2:
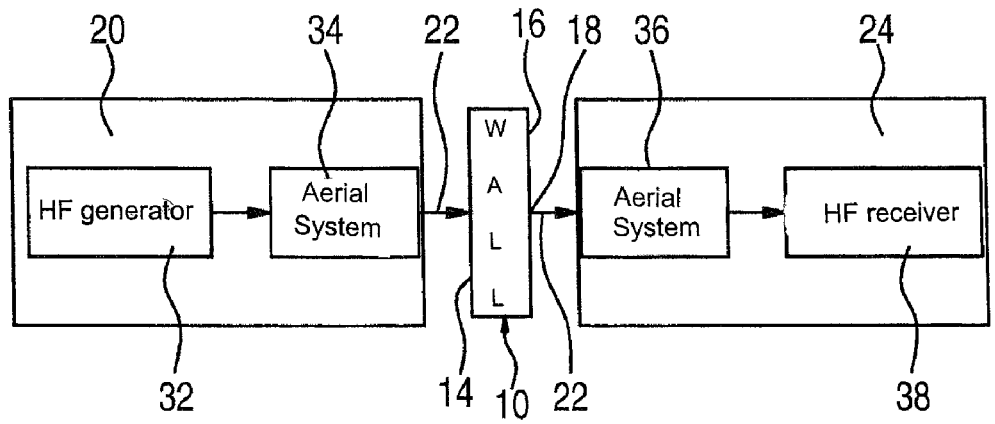
Figure 3:
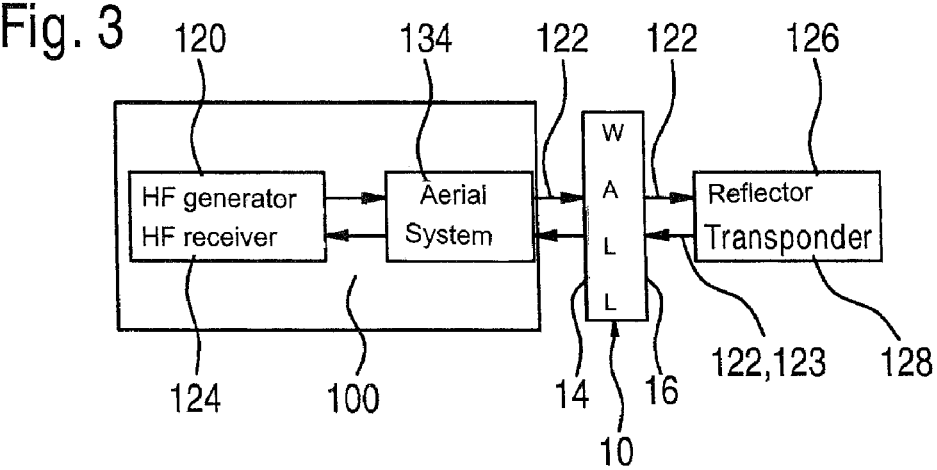
Figure 4:
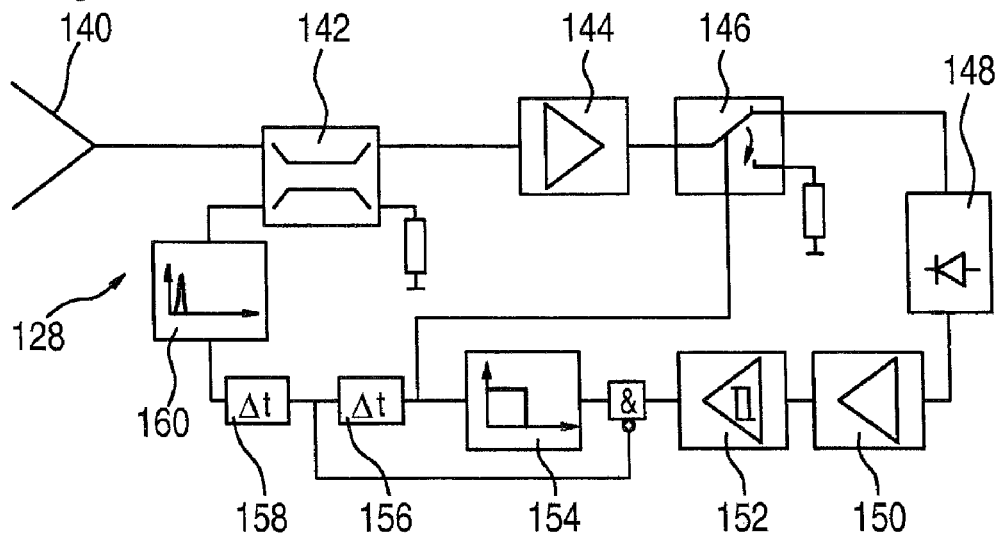
Figure 5:
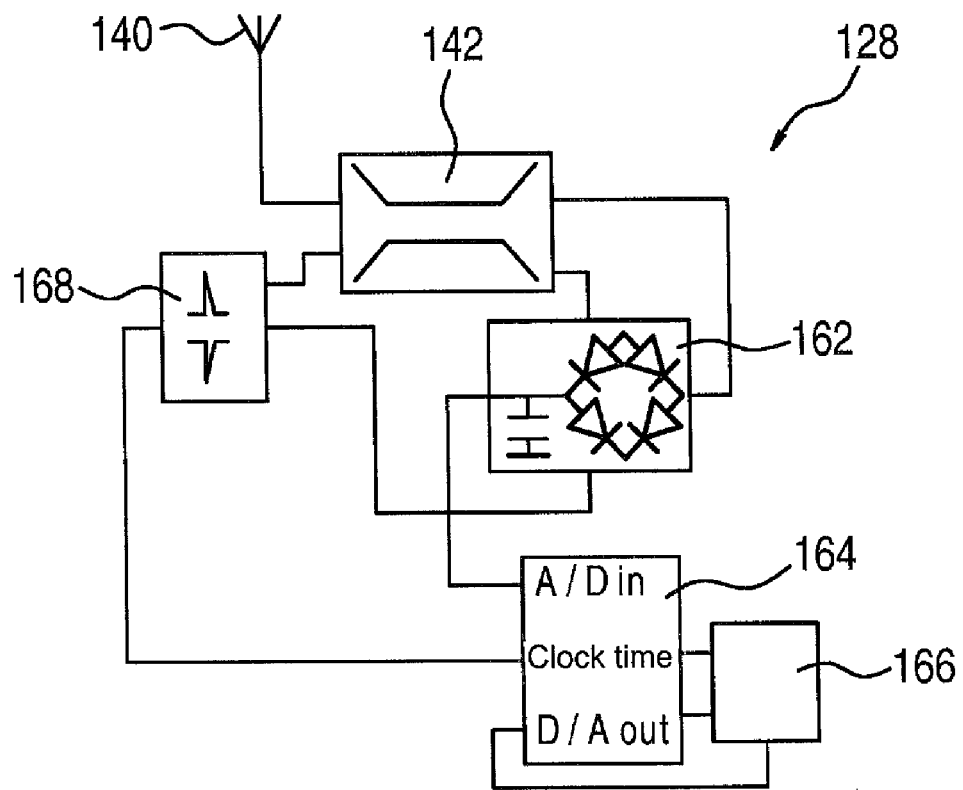
Figure 6:
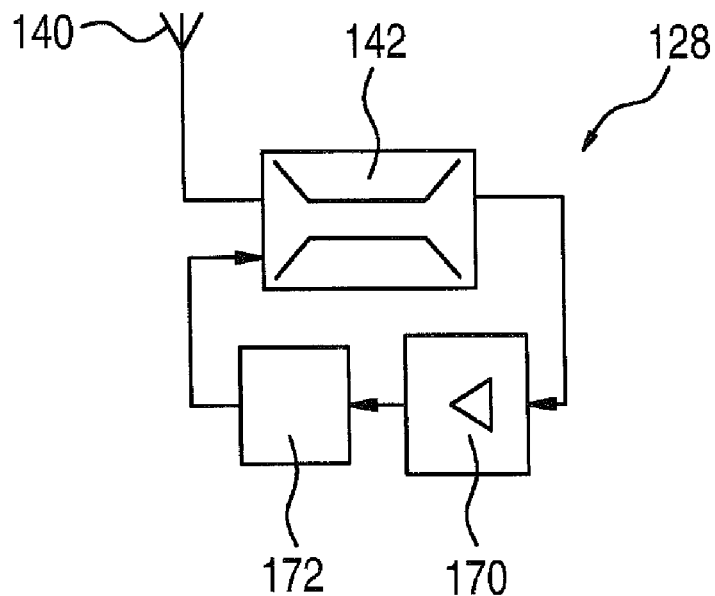

FIG. 1 shows a schematic illustration of the measurement situation in which the inventive method is used, FIG. 2 shows a schematic illustration of the essential method steps of the inventive method, FIG. 3 shows an alternative embodiment of the inventive method, depicted in a schematic illustration of essential method steps, FIG. 4 shows a first exemplary embodiment of the principal electronic components of a transponder for the inventive method, FIG. 5 shows an alternative realization of a transponder for the inventive method, FIG. 6 shows a further realization of a transponder of the inventive method, in a schematic illustration.

FIG. 1 shows a typical measurement situation in which the inventive method is used. Material-penetrative positioning methods are used when positioning must be carried out from both sides of a wall, a floor, or a ceiling. Walls, floors, ceilings or the like are referred to herebelow as a "wall" or as material 10 in general.

Based on a first defined point 12 on a first side 14 of a wall 10, the aim is to locate a point 18 which corresponds to the perpendicular projection of defined point 12, on second side 16 of the wall which is opposite from the first side. In this manner, the user can drill through wall 10 when he knows in advance where the drill will emerge on opposite side 16 of wall 10.

With the inventive method, a high-frequency transmitter is held or attached to wall 10 on one side 14. To this end, a wall holder, an adhesive device, or a stand can be provided for the high-frequency transmitter, for example. It is also possible to use suitable adapting means to fix the high-frequency transmitter in a hole of a pilot bore.

High-frequency transmitter includes a high-frequency transmitter 20 with a sending aerial that preferably points in the direction of the wall and emits a high-frequency measurement signal 22 into wall 10. Measurement signal 22 is in the gigahertz frequency range, with measurement frequencies that are typically in an interval of 1 GHz to 5 GHz. Preferably, one or more measurement frequencies from a frequency interval of 1.5 GHz to 3.5 GHz are used with the method according to the present invention. Directed high-frequency signal 22 from high-frequency transmitter 20 is subsequently detected by a high-frequency receiver 24 on second side 16 which is opposite from first side 14 of wall 10. To this end, high-frequency receiver 24 includes a receiving unit with one or more receiving aerials which receive measurement signal 22 and forward it to evaluation electronics of measuring device 24. To this end, high-frequency receiver 24 is typically moved over second surface 16 of wall 10 in the horizontal and vertical direction.

The maximum of measurement signal 22 can be located using optical or acoustic output means 26, e.g., a signal strength display 28. Via the selected frequency range of the inventive method, the positioning accuracy of the high-frequency receiver and, therefore, the accuracy of the localization of projection 30 at defined point 12 on second surface 16 of the wall can be increased markedly.

Various types of receivers are suitable for use as high-frequency receiver 24, e.g., radar or microwave receivers in particular, which receive the transmitted frequency signals either via broadband or narrow band, i.e., matched to the transmission frequency/frequencies. Capacitive receivers can also be used, the capacitance-generated high-frequency field of which is disturbed by transmitted signals 22 and which makes it possible to locate projection point 18 by measuring the intensity of this interference. Receiver 24 can also be, e.g., a high-frequency locating device, which can be switched to purely receiving operation using suitable software or hardware wiring.

FIG. 2 shows some of the essential method steps of the inventive material-penetrative positioning method, based on high frequency. A high-frequency unit 32 of a high-frequency transmitter 20 generates microwaves in the gigahertz range, e.g., using FMCW or a pulsed-radar method. Accordingly, the transmitter can generate one or more individual frequencies (FMCW method) or one broadband pulse spectrum (pulse radar). The microwave signals generated in this manner—which are measurement signal 22 of the inventive method—are emitted via an aerial system 34 which includes at least one aerial. When high-frequency transmitter 20 is placed on one side 14 of a workpiece, e.g., a wall 10, at a defined point, the microwaves—as directed high-frequency signal 22—penetrate the wall and can be detected by a high-frequency receiver 24 on the other side 16 of the wall. To this end, high-frequency receiver 24 includes a receiving aerial assembly 36 and a high-frequency receiving part 38 which processes the high-frequency signal which was received and depicts it in an intuitive manner, e.g., using a display device. The penetration point or projection point 18 of the measurement signal on second side 16 of wall 10 opposite from high-frequency transmitter 20 can be located using high-frequency receiver 24, and it can be marked on the wall surface using suitable means. In this manner, e.g., using the inventive method, it is possible to drill through reinforced concrete when the operator knows in advance where the drill will emerge on opposite side of wall to be drilled through. Due to the frequency range used, the inventive method makes it possible to locate the projection point with a high level of accuracy.

FIG. 3 shows an alternative embodiment of the inventive method. With the method according to FIG. 3, a measuring device 100 is used which is a high-frequency transmitter 120 and a high-frequency receiver 124. This device 100 generates a high-frequency signal 122 which penetrates a wall 10 in the manner described above. A single aerial element 134 can be used as the sending and receiving aerial, when wired accordingly. In further embodiments of the present invention, a separate arrangement of sending aerial and receiving aerial can be provided for measuring device 100. With the inventive method depicted in FIG. 3, reflecting means 126 are provided on side 16 of wall 10 opposite from the transmitter and the receiver; reflecting means 126 are a passive or an active reflector which returns the signals received from the transmitter and thereby forwards them to the high-frequency receiver. A reflector means of this type can be designed as a SAW (Surface Acoustic Wave) element. Measurement signal 122 returned by reflector means 126 can be located in the same frequency range or in a shifted frequency range.

Transponders can also be used as reflector means 126, which detect and process measurement signal 122 penetrating the wall and, after an internal delay time, return a response signal 123—which correlates with detected, original measurement signal 122—back through wall 10. Passive or active transponders can be used, i.e., transponders without or with an independent power supply.

FIG. 4 shows a possible embodiment of a transponder of this type for use with the inventive method. The high-frequency alternating field created by measuring device 100 penetrates a material, e.g., a wall to be investigated. A transponder 128 is located on the side of this wall opposite from measuring device 100 that locates and detects the signals created by the measuring device and returns them to the measuring device in a manner to be described below.

After a certain, known, internal transit time, a transponder of this type generates a new signal, which it emits via a separate aerial, e.g., in the ISM band, at a frequency of 2.45 GHz. This newly generated signal penetrates the wall again and can be detected by high-frequency receiver 124 of measuring device 100.

In this manner, with the aid of measuring device 100—which is a pulse reflectometer—a minimum transit time of the new signal transmitted by the transponder can be found, and the corresponding point on the wall can be marked. A marking unit can be located on measuring device 100 and on transponder 128. The determination of the wall thickness can also be advantageously carried out by evaluating the transit time between the reflectometer, i.e., measuring device 100, and transponder 128.

The basic design of a transponder of this type will be described below. Various types of high-frequency receivers are suitable for use as receivers in the transponder, e.g., power detectors, which evaluate the power level of the characteristic measurement signal of measuring device 100, or pulse detectors, which can detect the typical field changes of measuring device 100.

FIG. 4 shows the possible design of a transponder 128 of this type using a block diagram. The signal received by transponder 140 via an aerial unit 140 is directed via a coupler 142 or a circulator to a receiving amplifier 144. After it is amplified, the signal reaches a pulse detector 148 via a HF switch 146, which has been switched to the sleep state. Pulse detector 148 delivers an output voltage that is proportional to the input power. The voltage of pulse detector 148 is amplified in a low-frequency amplifier 150. In a downstream comparator, a digital signal is generated from the analog voltage signal. In a monoflop 154, the relatively short comparator signal is brought to a defined length. This signal is used—with the aid of time-delay units 156 and 158—to blank the receiving state and generate transmitted pulses. The signal created by transmitted pulse generator 160 is brought back via coupler 142 or a circulator to aerial device 140, and it is returned through the wall being investigated to measuring device 100.

FIG. 5 shows an alternative realization of a transponder 128. A sampler is used in this case. The control cycle of the sampler is regulated by a microcontroller 164 such that a maximum voltage occurs at the output of the sampler. Once this maximum of the output signal has been reached, the microcontroller cycle and the cycle of the measuring device 100 run in synchronicity, although shifted by the transit time of the measurement signal. In this manner it is possible to locate penetration site of the measurement signal and, if desired, to measure the wall thickness. Since the signal that controls the sampler is also sent directly, the response from the transponder takes place with minimal delay.

A further alternative of the basic design of a transponder for the inventive method is shown in FIG. 1 5.24 cm a simplified manner. With the concept shown in FIG. 6, the received measurement signal is amplified in transponder 128 by an amplifier 170 and, after a certain time delay that is realized by a delay unit 142, it is sent out again via coupler 142 and aerial unit 355.60 cm the manner of a loop amplifier.

In addition to the design and mode of operation of a transponder, described above, for the inventive method, it is also possible to add on to the transponder, e.g., with an AC sensor (50 Hz sensor) and/or an inductive sensor. An additional functionality of the transponder of this type makes it possible for the operator to also prevent damaging, e.g., a current lead, on the side, e.g., of a wall, opposite from measuring device 100.

The information is advantageously evaluated by high-frequency locating device 100, which can be switched to the receiving mode using suitable software or hardware wiring and thereby display, e.g., the position of the hole, and the wall thickness.

A locating device that operates using high frequency of the type described, e.g., in application DE 102 07 424 A1 from the applicant, can be used advantageously as the receiving device.

The inventive method and the inventive device for carrying out this method are not limited to the embodiments shown in the exemplary embodiments.

In particular, the inventive method is not limited to use in determining drilling channels in advance.

Advantageously, the inventive method can be integrated—in advance—devices of this type, such as a drilling tool.

It is also possible to carry out the inventive method described using existing high-frequency receivers and/or high-frequency transmitters by providing appropriate, additional software or hardware.

What is claimed is:

1. A material-penetrative positioning method for locating a measurement signal on walls, ceilings, and floors, comprising steps of:
    transmitting a measurement signal (22, 122) in the gigahertz frequency range using a high-frequency transmitter (20, 120) positioned at a first surface (14) of a material (10) to penetrate the material at least once;
    moveably positioning a reflecting means (126) at a second surface (16) of the material (10) to reflect a portion of the measurement signal (22, 122) that has penetrated; and
    receiving a portion of the measurement signal portion reflected from the reflecting means (126) using a high-frequency receiver (24, 124) positioned at the first surface (14) of the material (10) to locate a penetration position (18) of the measurement signal.

2. The method as recited in claim 1, wherein, the measurement signal (22, 122) has more than one measurement frequency.

3. The method as recited in claim 1, wherein the measurement signal (22, 122) is directed.

4. The method as recited in claim 1, wherein one or more measurement frequency/frequencies in an interval of 1000 MHz to 5000 MHz are used.

5. The method as set forth in claim 4, wherein said measurement frequency/frequencies fall within an interval of 1500 MHz to 3500 MHz.

6. The method as recited in claim 1, wherein the measurement signal (22, 122) is generated using the FMCW method in the gigahertz frequency range.

7. The method as recited in one of the claim 6, wherein the measurement signal (22, 122) in the gigahertz frequency range is generated using a pulsed-radar method and is transmitted into the material.

8. The method as recited in claim 1, wherein, the reflector means (126) include a SAW (Surface Acoustic Wave) element.

9. The method as recited in claim 1, wherein, the reflector means (126) include a transponder (128).

10. The method as recited in claim 1, further comprising utilizing a signal strength display to locate the measurement signal (22, 122, 123) which penetrated the workpiece (10), the display positioned at one of the high frequency receiver (24, 124) and/or reflecting means (126).

11. The method as recited in claim 1, wherein the steps of transmitting and receiving include that high-frequency transmitter (120) and the high-frequency receiver (124) are operated in the same device (100).

12. A material-penetrative positioning system for locating a measurement signal on walls, ceilings, and floors, comprising:
a high-frequency transceiver (100) positioned on a first surface (14) of a material (10) for transmitting a measurement signal (22, 122) in the gigahertz frequency range into and penetrating the material (10) at least once; and
a reflecting means (126) that is movably positioned at a second surface (16) of the material (10) to reflect a portion of the measurement signal (22, 122) that has penetrated;
wherein the high-frequency transceiver (100) receive a portion of the measurement signal portion reflected from the reflecting means (126) back to said first surface (14) of the material (10) to locate a penetration position (18) of the measurement signal.

13. The method as recited in claim 12, wherein the step of receiving further comprises that at least the high-frequency receiver (124) utilizes a marking device for producing a mark on a surface (14, 16).

14. The system as recited in claim 12, further comprising a signal strength display to locate the measurement signal (22, 122, 123) which penetrated the workpiece (10) at the high frequency transceiver.

* * * * *